United States Patent [19]

Petersson

[11] Patent Number: 5,035,570
[45] Date of Patent: Jul. 30, 1991

[54] DEVICE FOR TURNING A LOAD

[75] Inventor: Nils Petersson, Braås, Sweden

[73] Assignee: Leif Hultberg, Lenhovda, Sweden

[21] Appl. No.: 473,988

[22] PCT Filed: Oct. 25, 1988

[86] PCT No.: PCT/SE88/00564

§ 371 Date: May 9, 1990

§ 102(e) Date: May 9, 1990

[87] PCT Pub. No.: WO89/03799

PCT Pub. Date: May 5, 1989

[30] Foreign Application Priority Data

Oct. 26, 1987 [SE] Sweden .................. 8704149-7

[51] Int. Cl.⁵ .......................................... B65H 15/00
[52] U.S. Cl. ................................ 414/778; 414/758;
414/766; 280/47.12
[58] Field of Search ............... 414/778, 758, 760, 764,
414/766, 420; 280/47.12, 47.24; 254/95

[56] References Cited

U.S. PATENT DOCUMENTS

| 1,185,615 | 6/1916 | Beaumont et al. | |
| 2,029,656 | 2/1936 | Dawson | 280/47.12 |
| 2,424,258 | 7/1947 | Smith | 259/54 |
| 2,439,581 | 4/1948 | Robins | 414/778 X |
| 4,173,428 | 11/1979 | Thornberg | 414/766 |
| 4,705,283 | 11/1987 | Kleisath | 414/778 X |

FOREIGN PATENT DOCUMENTS

| 126619 | 2/1948 | Australia | 280/47.12 |
| 2628504 | 1/1978 | Fed. Rep. of Germany . | |
| 384354 | 5/1976 | Sweden . | |
| 432579 | 4/1984 | Sweden . | |
| 642919 | 5/1984 | Switzerland | 280/47.12 |

Primary Examiner—Frank E. Werner
Assistant Examiner—Brian K. Dinicola
Attorney, Agent, or Firm—Shapiro and Shapiro

[57] ABSTRACT

A device for turning upside-down a load which is positioned on a support so as to be spaced from an underlying surface, and especially for turning a pile of papers in conjunction with a printing press, comprises a load supporting member (1, 4) for carrying the load. A side support (6, 7) is adapted to engage one side of the load. A lever arrangement (1, 2) is connected with the load supporting member (1, 4) and adapted to be moved, together with the load supporting member, under the load to a starting position in which the load supporting member (1, 4) is located under the load, the side support (6, 7) engages the one side of the load, and the lever arrangement (1, 2) extends beyond the load at the opposite side thereof. A clamping arrangement (12, 13) is adapted for clamping the load against the load supporting member (1, 4) and the side support (6, 7). The device further comprises an arcuate support arrangement (9, 11) which is adapted to rest against the underlying surface and about which the device is turnable upon raising of the lever arrangement (1, 2) from the starting position and continued turning thereof for turning the load upside-down.

1 Claim, 2 Drawing Sheets

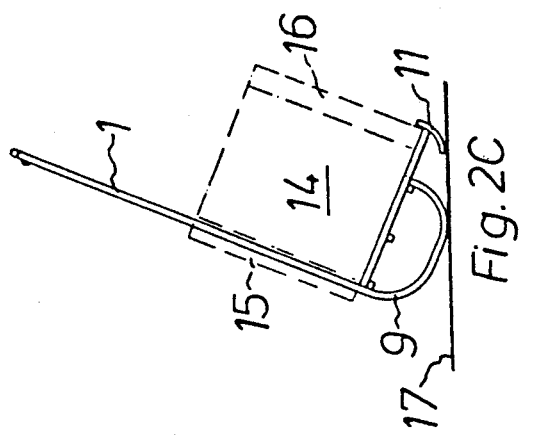
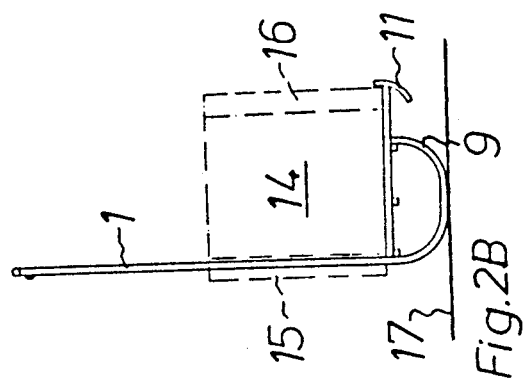
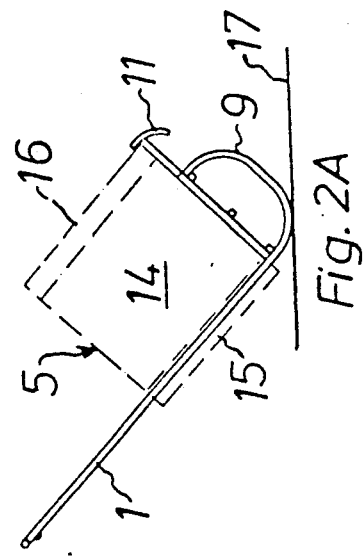
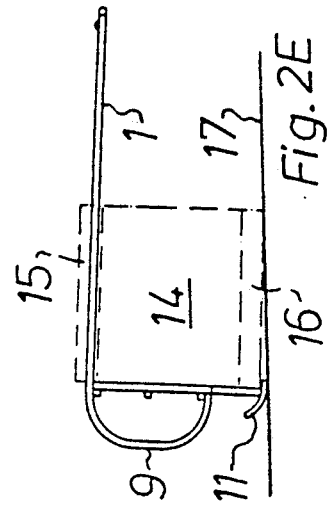
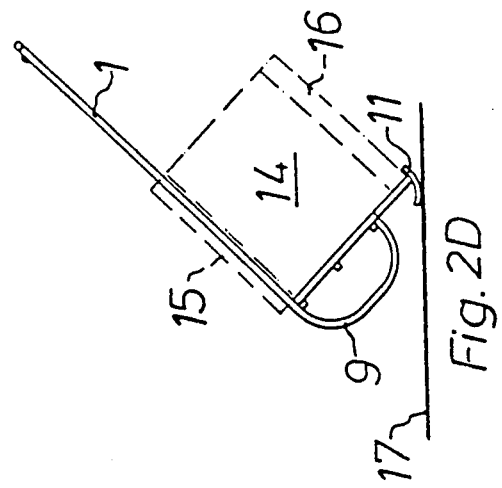

DEVICE FOR TURNING A LOAD

The present invention relates to a device for turning a load upside-down which is positioned on a support spaced from an underlying surface, especially for turning a pile of papers in conjunction with a printing press.

When printing sheets of paper in a printing press in which the sheets are printed on one side in a first run through the printing press and are printed on the other side in a second run therethrough, the sheets must be turned upside-down between the two printing operations. After the first printing operation, the sheets are deposited on a pallet at the output side of the printing press. When a finished pile of papers has been obtained on the pallet, a further pallet is placed on top of the pile which is then conveyed to a so-called pallet turning device to be turned upside-down. After such turning, the pile is conveyed to the input side of the printing press, whereupon the other side of the sheets of paper is printed in the second printing operation.

Pallet turning devices for use in connection with sheet printing presses are known from e.g. Swedish Patent Specification 7503412-4 and German Offenlegungsschrift 2,628,504. Both of them show pallet turning devices which are quite complicated. These pallet turning devices are also so expensive that one and the same pallet turning device is normally used for several printing presses. Since they are also bulky and heavy, they are fixedly mounted, and therefore the piles of papers must, as described above, be conveyed back and forth between the printing press and the pallet turning device.

A special object of the present invention is therefore to provide a simple and inexpensive pallet turning device which eliminates these drawbacks.

A more general object is to provide a simple and inexpensive as well as readily movable and manageable device for turning a load upside-down which is positioned on a support spaced from an underlying surface.

According to the present invention, these objects are achieved by means of a device which is of the type mentioned by way of introduction and which is characterized by a load supporting member for carrying the load; a side support adapted to engage one side of said load and connected with said load supporting member; a lever means for operating said device, said lever means being connected with said load supporting member and adapted to be moved, together with the load supporting member, under the load to a starting position in which said load supporting member is located under the load, said side support engages said one side of the load, and said lever means extends beyond the load at the opposite side thereof; a clamping means for clamping the load against the load supporting member and the side support; and an arcuate support means which is arranged on said side support and is adapted to rest against said underlying surface and about which said device is turnable upon raising of the lever means from said starting position and continued turning thereof for turning the load upside-down.

According to a preferred embodiment, the side support comprises a member fixedly connected with said load supporting member, and a member which is movable relative to the fixed member so as to adjust the height of said side support to the height of said load, and which is provided with a flange for engaging the upper side of the load.

The movable member of said side support preferably carries an arcuate support element included in said arcuate support means.

The invention will now be described in detail with reference to the accompanying drawings.

FIGS. 2A–2E are schematic side views of the device in different positions during turning of a load.

Figure 1:
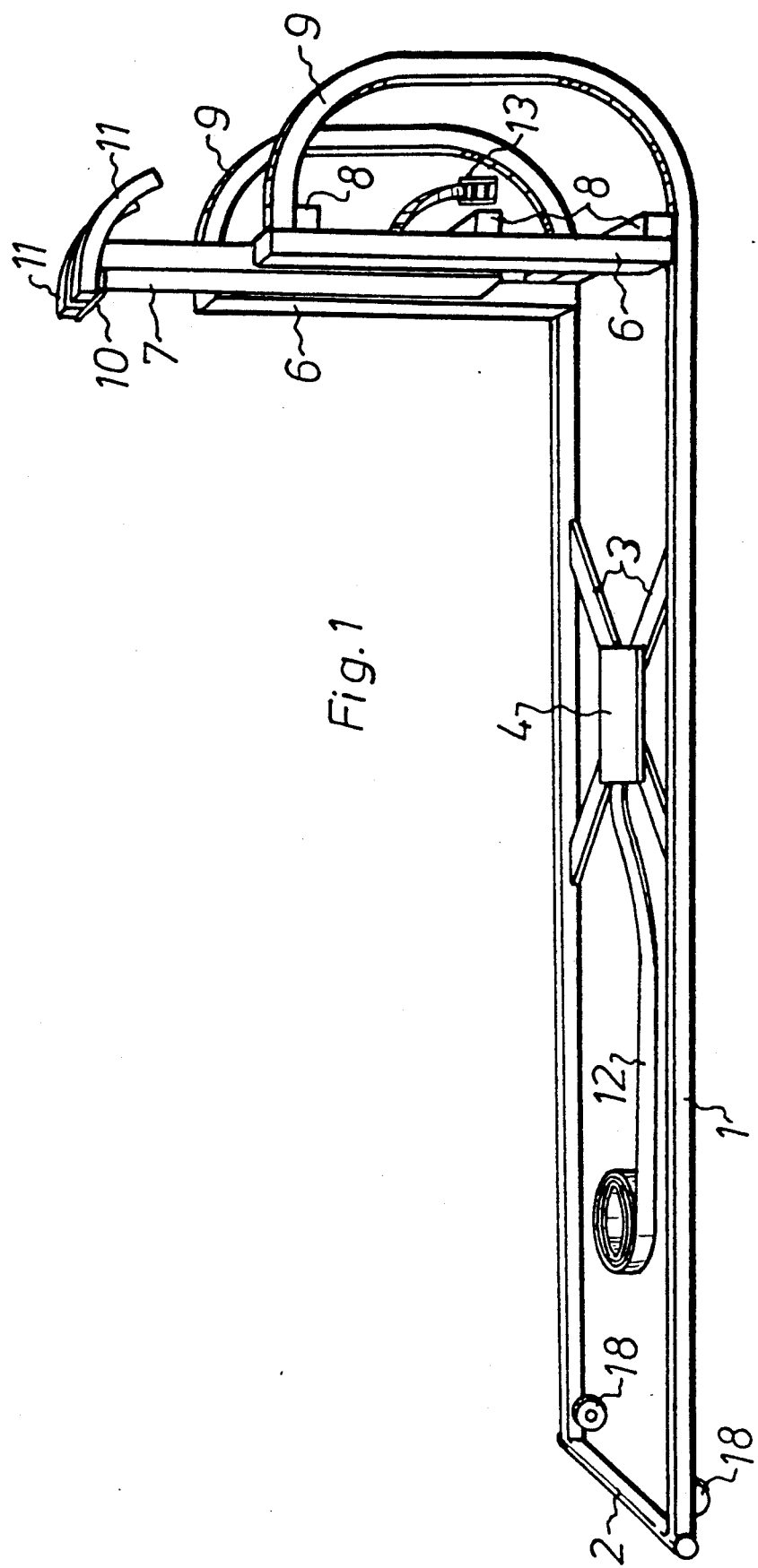
FIG. 1 is a perspective view of a device according to the invention in a starting position.

The device shown in the drawings is particularly intended to be used in conjunction with a sheet printing press for turning a pile of sheets upside-down.

The device will first be described with reference to FIG. 1, for which reason definitions such as "horizontal", "vertical", "upper" and "lower" refer to the starting position shown therein.

The device comprises a frame which consists of two horizontal, parallel rods 1 which at one end are interconnected by means of a cross bar 2. The cross bar 2 is of circular cross-section and forms a handle for operating the device. The two parallel rods 1 are also interconnected by struts 3 arranged in cross-shape and supporting a plate 4. The plate 4 is aligned with the planar upper surface of the rods 1 and forms, together with the rods, a support for the load 5 (FIG. 2A) which is to be turned.

At the side of the plate 4 opposite the handle 2, a side support beam 6 extends vertically upwards from each of the two parallel rods 1. The side support beams 6 which are considerably wider than the rods 1, are adapted to form, together with a member 7 which is vertically movable between the beams, a side support adapted to engage one side of the load.

The side support beams 6 are interconnected at the back (to the right in FIG. 1) by three cross bars 8. Each rod 1 has an extension member 9 extending arcuately from the lower part of the respective side support beam 6 to the upper part thereof where it is connected with the beam 6. The two extension members 9 are interconnected by means of both the upper and the lower cross bar 8.

The member 7 which is vertically movable to adjust the height of the side support to the height of the load, has at its upper portion a horizontally projecting flange 10 for engaging the upper side of the load. The member 7 is freely movable, and it should be pointed out that it is not kept in the slightly raised position shown in FIG. 1 unless its flange 10 engages a load. It should also be pointed out that the member 7 is freely extractable upwards from its position between the side support beams 6.

The movable member 7 also carries, at its upper portion, two arcuate rods 11 arranged side by side and forming an arcuate support element which forms, together with the extension members 9 of the parallel rods 1, an arcuate support means about which the device is turnable upon raising of the lever means formed of the handle 2 and the rods 1, from the starting position shown in FIG. 1. This turning of the device will be described below with reference to FIGS. 2A–2E.

A clamping band 12 is attached to the underside of the plate 4. A clasp 13 for the clamping band 12 is attached to the intermediate cross bar 8. The clamping band 12 is adapted to be clamped over the load to press it against the load supporting member 1, 4 and the side support 6, 7. The clamping band 12 is placed over the load and over the flange 10 between the arcuate rods 11 and is inserted in the clasp 13 to be tightened and locked.

The load 5 shown in FIGS. 2A–2E comprises a pile of sheets 14, a pallet 15 on which the pile is built up, and a pallet 16 which, in an inverted state, has been disposed on top of the pile. The pallets 15 and 16 can be replaced by carriages.

When the load 5 is resting on a surface 17, the device is pushed under the load into a starting position in which the load supporting member 1, 4 is located under the load 5, and the side support 6, 7 engages one side of the load. Part of the lever means 1, 2 extends, in this position, beyond the load 5 at the opposite side thereof. To facilitate pushing the device under the load, each of the parallel rods 1 is provided with a wheel 18 adjacent the handle 2. While the device is being pushed in, the vertically movable member 7 is kept in a raised position and, when the starting position has been reached, it is again let down so that the flange 10 comes into engagement with the upper side of the load 5, in this case with the upper pallet 16 (see FIG. 2A).

To turn the load 5 upside-down, the handle 2 and thus the rods 1, i.e. the lever means 1, 2 formed thereof, are raised from the starting position (FIG. 1) and turned through 180° to the final position shown in FIG. 2E. During turning, the device is supported first on the surface 17 by means of the arcuate extension members 9 (FIGS. 2A and 2B), whereupon the arcuate rods 11 (FIGS. 2C–2E) take over the supporting action. FIG. 2A shows the device in a turning position in which it is supported on the surface 17 by means of the extension members 9. FIG. 2B shows the device in a vertical position in which the load has been turned through 90°. FIG. 2C shows the device in the turning position in which the rods 11 take over the supporting action from the extension members 9. FIG. 2D shows the device in a turning position in which it is supported on the surface 17 by means of the rods 11. FIG. 2E shows, as mentioned above, the device in its final position, i.e. in the position in which the load has been turned upside-down. In the final position, the clamping band 12 is released, whereupon the device is lifted off from the inverted load resting on the pallet 16 which is now the lower pallet.

I claim:

1. A device for turning upside-down a load (5) which is positioned on a support (15) so as to be spaced from an underlying surface (17), such as for turning a pile of papers in conjunction with a printing press, comprising a load supporting member (1, 4) for carrying the load (5); a side support (6, 7) adapted to engage one side of said load (5) and including a member (6) fixedly connected with said load supporting member (1, 4), and a member (7) which is movable relative to the fixed member so as to adjust the height of said side support to the height of said load (5), and which is provided with a flange (10) for engaging the upper side of said load (5); lever means (1, 2) for manipulating said device, said lever means being connected with said load supporting member (1, 4) and adapted to be moved, together with the load supporting member, under the load (5) to a starting position in which said load supporting member (1, 4) is located under the load (5), said side support (6, 7) engages said one side of the load, and said lever means (1, 2) extends beyond the load at the opposite side thereof; clamping means (12, 13) for clamping the load (5) against the load supporting member (1, 4) and the side support (6, 7); and arcuate support means (9, 11) arranged on said side support and adapted to rest against said underlying surface (17) and about which said device is turnable upon raising of the lever means (1, 2) from said starting position and continued turning thereof for turning the load (5) upside-down, an arcuate support element (11) of said arcuate support means being carried by said movable member (7) of said side support.

* * * * *